US009545909B2

(12) United States Patent
Kiebel et al.

(10) Patent No.: US 9,545,909 B2
(45) Date of Patent: Jan. 17, 2017

(54) SPARK CONTROL SYSTEMS AND METHODS FOR ENGINE TORQUE ESTIMATION

(71) Applicant: GM Global Technology Operations LLC, Detroit, MI (US)

(72) Inventors: Karl T. Kiebel, Royal Oak, MI (US); Stefan E. Lindner, Friesenheim (DE); Jeffrey M. Kaiser, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 191 days.

(21) Appl. No.: 14/497,780

(22) Filed: Sep. 26, 2014

(65) Prior Publication Data
US 2016/0090101 A1    Mar. 31, 2016

(51) Int. Cl.
| | | |
|---|---|---|
| B60W 50/04 | (2006.01) |
| G07C 5/08 | (2006.01) |
| B60W 10/06 | (2006.01) |
| B60W 10/08 | (2006.01) |
| F02P 5/15 | (2006.01) |
| B60W 20/00 | (2016.01) |

(52) U.S. Cl.
CPC .............. *B60W 10/06* (2013.01); *B60W 10/08* (2013.01); *B60W 20/10* (2013.01); *F02P 5/15* (2013.01); *G07C 5/085* (2013.01)

(58) Field of Classification Search
CPC .............. B60W 50/04; B60W 2510/06; B60W 2050/041; B60W 2050/043; B60W 2050/045; G07C 5/08; G07C 5/085; G07C 5/0808; G07C 5/0816; G07C 5/0841; F02P 5/1512; F02P 5/15; F02P 5/1502; F02P 15/00; F02P 5/02; F02P 17/02; G01M 15/00; G01M 15/05; G01M 15/044

USPC ............ 701/101, 102, 105, 113; 123/406.11, 123/406.12, 406.23, 406.2, 406.13; 73/1.09, 73/114.13, 114.14, 114.15, 114.62, 114.63
See application file for complete search history.

(56) References Cited

U.S. PATENT DOCUMENTS

| | | | | |
|---|---|---|---|---|
| 4,471,737 A | * | 9/1984 | McDougal .............. | F02B 77/04 123/406.26 |
| 4,693,221 A | * | 9/1987 | Nakajima ................ | F02P 11/06 123/406.16 |
| 4,825,832 A | * | 5/1989 | Satoh ..................... | F02P 5/1521 123/406.21 |
| 5,572,970 A | * | 11/1996 | Fukumura .............. | B60K 28/16 123/198 F |
| 6,272,428 B1 | * | 8/2001 | Heath ..................... | F02P 7/10 123/406.6 |
| 6,457,455 B2 | * | 10/2002 | Baeuerle ................ | F02D 35/027 123/406.24 |

(Continued)

*Primary Examiner* — Hung Q Nguyen
*Assistant Examiner* — John Bailey

(57) ABSTRACT

A spark control module, for an engine speed and an engine load: for a first predetermined period, supplies spark to each cylinder of the engine at a predetermined spark timing set for the engine speed and the engine load. For a second period following the first predetermined period, the spark control module: provides spark to a first one of the cylinders at a first spark timing that is retarded relative to the predetermined spark timing; and supplies spark to all of the other cylinders of the engine at the predetermined spark timing. The storage module selectively stores in memory: a first torque output of the engine measured during the first predetermined period; and a second torque output of the engine measured during the second period.

20 Claims, 9 Drawing Sheets

(56) References Cited

U.S. PATENT DOCUMENTS

| | | | | |
|---|---|---|---|---|
| 6,725,830 B2* | 4/2004 | Surnilla | ............... | F01N 13/011 123/339.11 |
| 6,772,731 B2* | 8/2004 | Miura | ............... | F01L 1/053 123/399 |
| 6,820,602 B1* | 11/2004 | Masters | ............... | F02P 3/0456 123/406.58 |
| 6,932,053 B2* | 8/2005 | Ichihara | ............... | F02D 11/105 123/344 |
| 7,284,367 B2* | 10/2007 | Hasegawa | ............... | F02D 13/04 123/339.1 |
| 7,367,322 B2* | 5/2008 | Miyata | ............... | F01N 3/0814 123/326 |
| 8,392,096 B2* | 3/2013 | Mathews | ............... | F02P 5/045 123/406.11 |
| 8,762,033 B2* | 6/2014 | Tanaka | ............... | F02D 37/02 123/325 |
| 8,887,692 B2* | 11/2014 | Baur | ............... | F02D 13/0219 123/198 F |
| 9,151,264 B2* | 10/2015 | Nakamura | ............... | F02P 5/1502 |
| 9,366,220 B2* | 6/2016 | Leufen | ............... | F02P 5/1502 |
| 2004/0083717 A1* | 5/2004 | Zhu | ............... | F01N 3/2006 60/284 |
| 2008/0154485 A1* | 6/2008 | Yasuda | ............... | F01N 3/101 701/113 |
| 2009/0107458 A1* | 4/2009 | Surnilla | ............... | F02D 41/0082 123/406.23 |
| 2009/0229562 A1* | 9/2009 | Ramappan | ............... | F02B 1/14 123/295 |
| 2009/0256513 A1* | 10/2009 | Ando | ............... | B60K 6/445 318/478 |
| 2010/0057327 A1* | 3/2010 | Glugla | ............... | F02D 35/028 701/103 |
| 2010/0082220 A1* | 4/2010 | Whitney | ............... | F02D 11/105 701/102 |
| 2010/0108031 A1* | 5/2010 | Pursifull | ............... | F02P 5/1508 123/406.5 |
| 2010/0108032 A1* | 5/2010 | Pursifull | ............... | B60W 10/06 123/406.12 |
| 2010/0212633 A1* | 8/2010 | Ishikawa | ............... | F02P 7/067 123/406.23 |
| 2011/0130902 A1* | 6/2011 | Heisel | ............... | B60K 6/485 701/22 |
| 2012/0180759 A1* | 7/2012 | Whitney | ............... | F02D 13/0219 123/406.23 |
| 2013/0047956 A1* | 2/2013 | Davis | ............... | F02P 5/152 123/406.11 |
| 2013/0081596 A1* | 4/2013 | Nakamura | ............... | F02P 5/1502 123/406.2 |
| 2014/0000555 A1* | 1/2014 | Glugla | ............... | F02D 41/008 123/305 |
| 2015/0047607 A1* | 2/2015 | Glugla | ............... | F02P 5/145 123/406.23 |
| 2015/0159573 A1* | 6/2015 | Glugla | ............... | F02D 41/1498 701/103 |

* cited by examiner

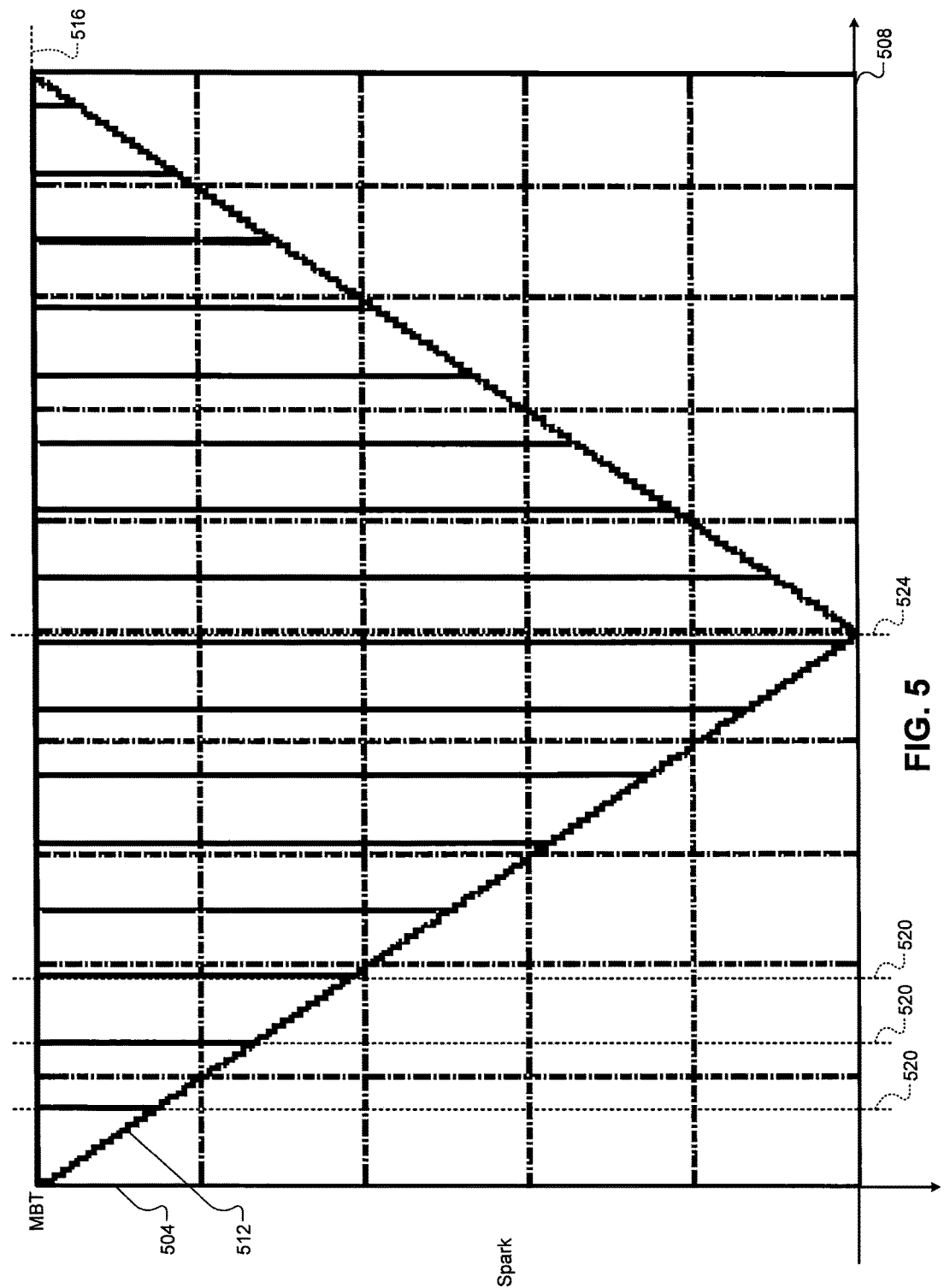

SPARK CONTROL SYSTEMS AND METHODS FOR ENGINE TORQUE ESTIMATION

FIELD

The present disclosure relates to internal combustion engines of vehicles and more particularly to engine control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel in cylinders to produce drive torque. Air flows into an intake manifold through a throttle valve. Air flows into the cylinders via intake valves. Fuel injectors inject fuel for the cylinders, such as directly into the cylinders. Spark plugs initiate combustion.

An engine control module (ECM) controls spark timing of the cylinders. The ECM may retard the spark timing from a predetermined spark timing under some circumstances. Retarding the spark timing may reduce engine torque output relative to the use of the predetermined spark timing. Retarding the spark timing may also increase a temperature of exhaust produced by the engine.

SUMMARY

In a feature, a data collection system for an engine is disclosed. A spark control module, for an engine speed and an engine load: for a first predetermined period, supplies spark to each cylinder of the engine at a predetermined spark timing set for the engine speed and the engine load. For a second period following the first predetermined period, the spark control module: provides spark to a first one of the cylinders at a first spark timing that is retarded relative to the predetermined spark timing; and supplies spark to all of the other cylinders of the engine at the predetermined spark timing. The storage module selectively stores in memory: a first torque output of the engine measured during the first predetermined period; and a second torque output of the engine measured during the second period.

In further features, the spark control module determines the first spark timing by retarding the predetermined spark timing by a predetermined amount.

In further features, for a third period following the second period, the spark control module further: provides spark to a second one of the cylinders of the engine at a second spark timing that is retarded relative to the first spark timing; and supplies spark to all of the other cylinders of the engine at the predetermined spark timing, wherein the first and second ones of the cylinders are different.

In further features, the spark control module: determines the first spark timing by retarding the predetermined spark timing by a predetermined amount; and determines the second spark timing by retarding the first spark timing by the predetermined amount.

In further features, in response to a determination that an exhaust temperature is greater than a predetermined temperature, the spark control module provides spark to the second one of the cylinders at the second spark timing and supplies spark to all of the other cylinders at the predetermined spark timing.

In further features, in response to engine misfire, the spark control module provides spark to the second one of the cylinders at the second spark timing and supplies spark to all of the other cylinders at the predetermined spark timing.

In further features, for a third period following the second period, the spark control module further: provides spark to a second one of the cylinders of the engine at the first spark timing that is retarded relative to the predetermined spark timing; and supplies spark to all of the other cylinders of the engine, including the first one of the cylinders, at the predetermined spark timing, wherein the first and second ones of the cylinders are different.

In further features, for a fourth period following the third period, the spark control module further: provides spark to the second one of the cylinders of the engine at a second spark timing that is retarded relative to the first spark timing; and supplies spark to all of the other cylinders of the engine at the predetermined spark timing.

In further features, the storage module: stores the first torque output of the engine in a first entry of a mapping corresponding to the predetermined spark timing, the engine load, and the engine speed; and stores the second torque output of the engine in a second entry of the mapping corresponding to the first spark timing, the engine load, and the engine speed.

In further features, a coefficient module: based on the first and second torque outputs, generates an engine torque output model for estimating engine torque output; and determines a plurality of coefficients based on the engine torque output model. An engine control module: determines an estimated torque output of an engine based on a spark timing, an engine speed, the plurality of coefficients, and one of an intake manifold pressure and an air per cylinder (APC); and controls a throttle valve based on the estimated torque output of the engine.

In a feature, a data collection method for an engine is disclosed. The data collection method includes, for an engine speed and an engine load: for a first predetermined period, supplying spark to each cylinder of an engine at a predetermined spark timing set for the engine speed and the engine load. The data collection method further includes, for a second period following the first predetermined period: providing spark to a first one of the cylinders at a first spark timing that is retarded relative to the predetermined spark timing; and supplying spark to all of the other cylinders of the engine at the predetermined spark timing. The data collection method further includes selectively storing in memory: a first torque output of the engine measured during the first predetermined period; and a second torque output of the engine measured during the second period.

In further features, the data collection method further includes determining the first spark timing by retarding the predetermined spark timing by a predetermined amount.

In further features, the data collection method further includes, for a third period following the second period: providing spark to a second one of the cylinders of the engine at a second spark timing that is retarded relative to the first spark timing; and supplying spark to all of the other cylinders of the engine at the predetermined spark timing, wherein the first and second ones of the cylinders are different.

In further features, the data collection method further includes: determining the first spark timing by retarding the predetermined spark timing by a predetermined amount; and determining the second spark timing by retarding the first spark timing by the predetermined amount.

In further features, the data collection method further includes, in response to a determination that an exhaust temperature is greater than a predetermined temperature: providing spark to the second one of the cylinders at the second spark timing; and supplying spark to all of the other cylinders at the predetermined spark timing.

In further features, the data collection method further includes, in response to engine misfire: providing spark to the second one of the cylinders at the second spark timing; and supplying spark to all of the other cylinders at the predetermined spark timing.

In further features, the data collection method further includes, for a third period following the second period: providing spark to a second one of the cylinders of the engine at the first spark timing that is retarded relative to the predetermined spark timing; and supplying spark to all of the other cylinders of the engine, including the first one of the cylinders, at the predetermined spark timing, wherein the first and second ones of the cylinders are different.

In further features, the data collection method further includes, for a fourth period following the third period: providing spark to the second one of the cylinders of the engine at a second spark timing that is retarded relative to the first spark timing; and supplying spark to all of the other cylinders of the engine at the predetermined spark timing.

In further features, the data collection method further includes: storing the first torque output of the engine in a first entry of a mapping corresponding to the predetermined spark timing, the engine load, and the engine speed; and storing the second torque output of the engine in a second entry of the mapping corresponding to the first spark timing, the engine load, and the engine speed.

In further features, a method further includes, based on the first and second torque outputs stored according to the data collection method: generating an engine torque output model for estimating engine torque output; determining a plurality of coefficients based on the engine torque output model; determining an estimated torque output of an engine based on a spark timing, an engine speed, the plurality of coefficients, and one of an intake manifold pressure and an air per cylinder (APC); and controlling a throttle valve based on the estimated torque output of the engine.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 5-7 are example graphs of spark timing over time; and

In the drawings, reference numbers may be reused to identify similar and/or identical elements.

DETAILED DESCRIPTION

Figure 1:
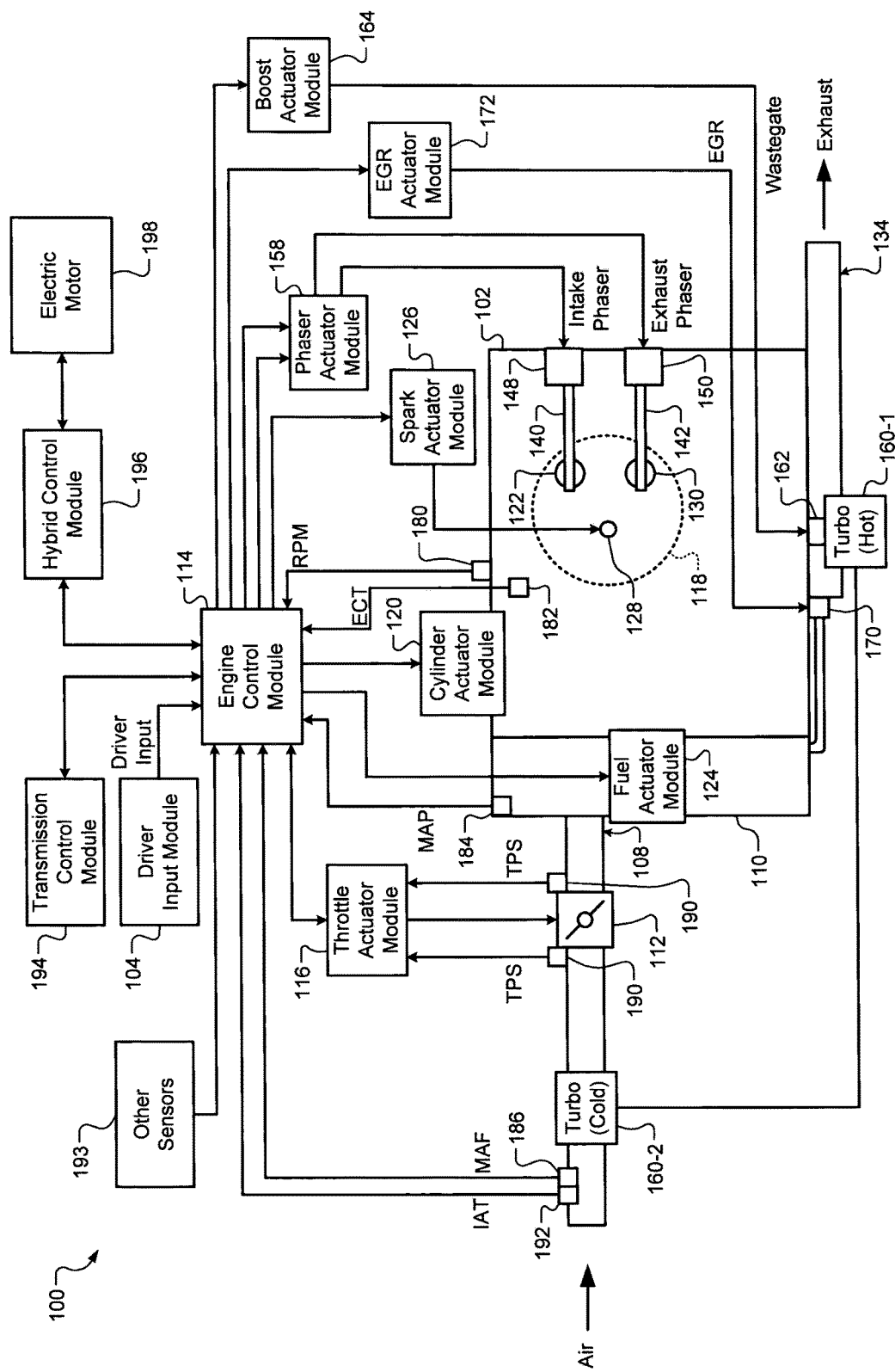
FIG. 1 is a functional block diagram of an example engine system.

Internal combustion engines combust an air and fuel mixture within cylinders to generate torque. An engine control module (ECM) controls engine actuators based on an engine torque request. The ECM estimates a first engine torque output based on a present spark timing, an intake manifold pressure, an engine speed, and a first set of coefficients. The ECM also estimates a second engine torque output based on the present spark timing, an air per cylinder (APC), the engine speed, and a second set of coefficients. The ECM may control one or more of the engine actuators based on the first and/or second estimated engine torque outputs. For example, the ECM may adjust opening of a throttle valve, position of a cam phaser, and/or output of a boost device based on the first and/or second estimated engine torque outputs.

The first and second sets of coefficients are calibrated based on torque measurements obtained using a dynamometer. More specifically, the engine is controlled based on predetermined combinations of engine speed and engine load. At each combination of engine speed and engine load, a respective predetermined spark timing for that engine speed and engine load is provided to all cylinders of the engine and a measured torque output of the engine is recorded. The engine produces a maximum engine output torque at the predetermined spark timing for that engine speed and engine load.

Additionally, spark timing is retarded at each combination of engine speed and load, and the measured torque output of the engine is recorded at each amount of spark timing retardation. The first and second sets of coefficients are calibrated based on the recorded torque output measurements. The coefficients are stored for use by the ECM ECMs that control other ones of that same engine.

The spark timing could be retarded to all of the cylinders of the engine at the same time. In other words, the same retarded spark timing could be supplied to all of the cylinders. However, retarding spark timing increases exhaust temperature. Retarding the spark timing from the predetermined spark timing for an engine speed and an engine load may also increase a likelihood of engine misfire occurring.

The present disclosure involves retarding the spark timing of one cylinder and, while retarding the spark timing of the one cylinder, providing spark to all of the other cylinders at the predetermined spark timing. Retarding the spark timing of one cylinder increases the exhaust temperature more slowly than when the spark timing of all of the cylinders is retarded. Which cylinder is receiving the retarded spark timing is changed over time. Retarding the spark timing of only one cylinder at a time may allow the spark timing to be retarded further than if the spark timing of all of the cylinders is retarded. Therefore, torque output measurements can be recorded for a larger range of spark retardation. This increases the accuracy of the coefficients.

Retarding the spark timing of one cylinder at a time may also provide one or more other benefits, such as decreasing the period necessary to obtain all of the torque output measurements. This may be due to decreasing the amount of time spent operating the engine at the predetermined spark timing to cool one or more components that receive exhaust heat, such as a turbocharger.

Referring now to FIG. 1, a functional block diagram of an example engine system 100 is presented. The engine system 100 of a vehicle includes an engine 102 that combusts an air/fuel mixture to produce torque based on driver input from a driver input module 104. Air is drawn into the engine 102 through an intake system. The intake system may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may halt provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented.

The cylinder actuator module 120 may deactivate the cylinder 118 by disabling opening of the intake valve 122 and/or the exhaust valve 130. The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include a boost device that provides pressurized air to the intake manifold 110. For example, FIG. 1 shows a turbocharger including a turbine 160-1 that is driven by exhaust gases flowing through the exhaust system 134. The turbocharger also includes a compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. Although shown separated for purposes of illustration, the turbine 160-1 and the compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The ECM 114 may use signals from the sensors to make control decisions for the engine system 100.

The ECM 114 may communicate with a transmission control module 194 to coordinate shifting gears in the transmission. For example, the ECM 114 may reduce engine torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to a cylinder activation/deactivation sequence, fueling rate, intake and exhaust cam phaser angles, boost pressure, and EGR valve opening area, respectively. The ECM 114 may control the actuator values in order to cause the engine 102 to generate a requested engine output torque.

Figure 2:
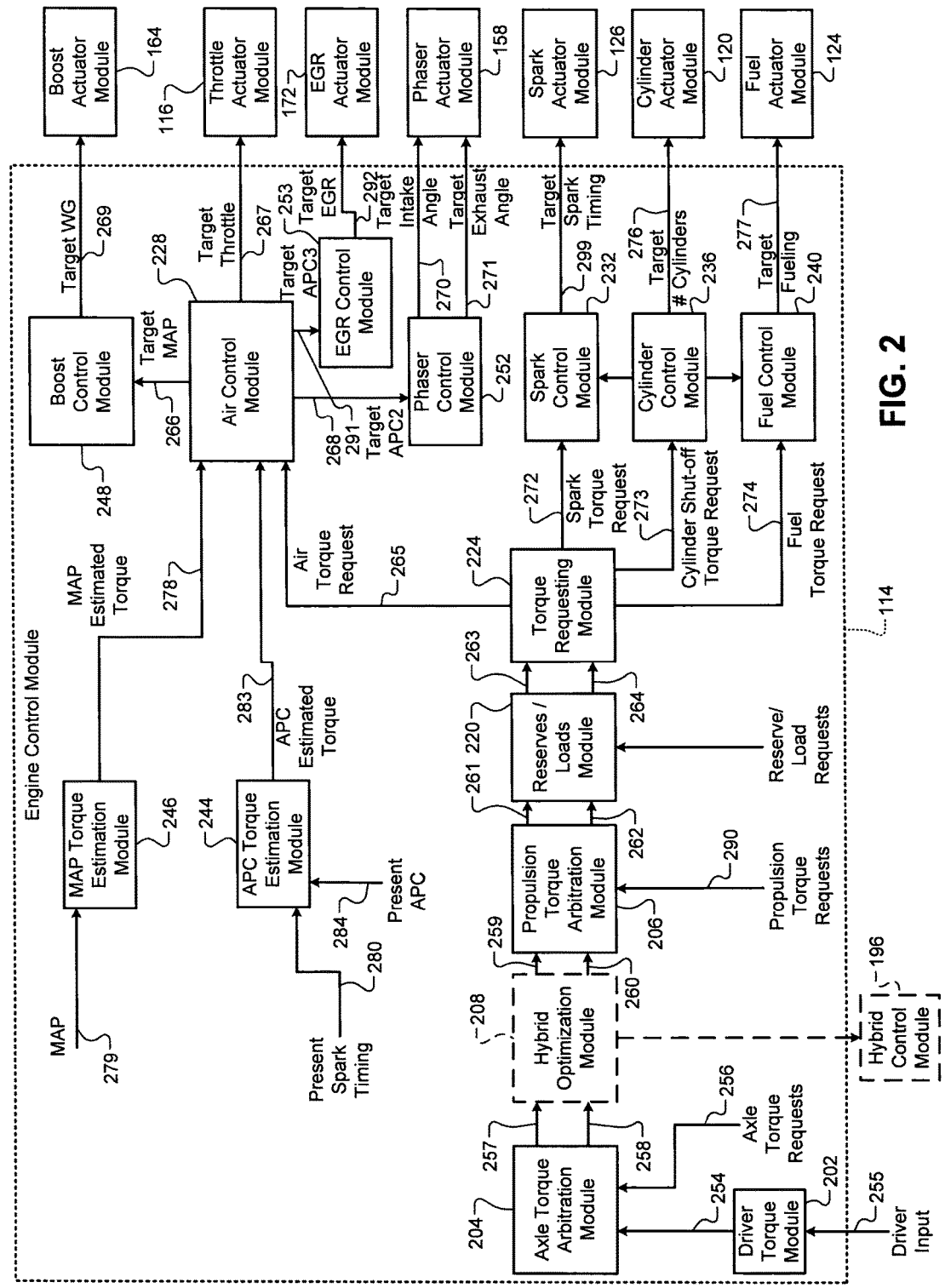
FIG. 2 is a functional block diagram of an example engine control system.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The ECM 114 also includes a reserves/loads module 220, a torque requesting module 224, an air control module 228, a spark control module 232, a cylinder control module 236, and a fuel control module 240. The ECM 114 also includes an air per cylinder (APC) torque estimation module 244, a MAP torque estimation module 246, a boost control module 248, a phaser control module 252, and an EGR control module 253.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including an engine and/or an electric motor. For example, the axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative. The axle torque requests 256 may also include one or more other axle torque requests.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the actuators of the engine system 100.

In general terms, the immediate torque request 258 is the amount of currently target axle torque, while the predicted torque request 257 is the amount of axle torque that may be needed on short notice. The ECM 114 controls the engine system 100 to produce an axle torque equal to the immediate torque request 258. However, different combinations of actuator values may result in the same axle torque. The ECM 114 may therefore adjust the target actuator values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on an icy surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. As described in more detail below, fast engine actuators are defined in contrast with slow engine actuators.

In general terms, fast engine actuators can change the axle torque more quickly than slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request 257 if the fast actuators were set to appropriate values. Meanwhile, the ECM 114 may set target actuator values for fast actuators to values that, given the slow actuator values, cause the engine system 100 to produce the immediate torque request 258 instead of the predicted torque request 257.

The fast actuators therefore cause the engine system 100 to produce the immediate torque request 258. When the ECM 114 decides to transition the axle torque from the immediate torque request 258 to the predicted torque request 257, the ECM 114 changes the target actuator values for one or more fast actuators to values that correspond to the predicted torque request 257. Because the target actuator values for the slow actuators have already been set based on the predicted torque request 257, the engine system 100 is able to produce the predicted torque request 257 after only the (minimal) delay imposed by the fast actuators. In other words, the longer delay that would otherwise result from changing axle torque using slow actuators is avoided.

For example only, in a spark-ignition engine, spark timing may be a fast actuator value, while throttle opening may be a slow actuator value. Spark-ignition engines may combust fuels including, for example, gasoline and ethanol, by applying a spark. By contrast, in a compression-ignition engine, fuel flow may be a fast actuator value, while throttle opening may be used as an actuator value for engine characteristics other than torque. Compression-ignition engines may combust fuels including, for example, diesel fuel, via compression.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

For example, the propulsion torque requests 290 may include torque reductions for engine over-speed protection, torque increases for stall prevention, and torque reductions requested by the transmission control module 194 to accommodate gear shifts. The propulsion torque requests 290 may also result from clutch fuel cutoff, which reduces the engine output torque when the driver depresses the clutch pedal in a manual transmission vehicle to prevent a flare (rapid rise) in engine speed.

The propulsion torque requests 290 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the torque requesting module 224.

The torque requesting module 224 receives the adjusted predicted and immediate torque requests 263 and 264. The torque requesting module 224 determines how the adjusted predicted and immediate torque requests 263 and 264 will be achieved.

The torque requesting module 224 may generate an air torque request 265 based on the adjusted predicted torque request 263. The air torque request 265 may be equal to the adjusted predicted torque request 263, setting air flow so that the adjusted predicted torque request 263 can be achieved by changes to other (e.g., fast) actuators.

Target actuator values for airflow controlling actuators may be determined based on the air torque request 265. For example only, the air control module 228 may determine a target manifold absolute pressure (MAP) 266, a target throttle opening (e.g., area) 267, a second target air per cylinder (APC2) 268, and a third target APC (APC3) 291 based on the air torque request 265.

The boost control module 248 may determine a target duty cycle 269 for the wastegate 162 based on the target MAP 266. While the target duty cycle 269 will be discussed, the boost control module 248 may determine another suitable value for controlling the wastegate 162. The phaser control module 252 may determine target intake and exhaust cam phaser angles 270 and 271 based on the second target APC 268. The EGR control module 253 determines a target EGR opening 292 based on the third target APC 291.

The torque requesting module 224 may also generate a spark torque request 272, a cylinder shut-off torque request 273, and a fuel torque request 274. The spark control module 232 may determine how much to retard the spark timing (which reduces engine output torque) from an optimum spark timing based on the spark torque request 272. For example only, a torque relationship may be inverted to solve for a target spark timing 299. For a given torque request ($T_{des}$), the target spark timing ($S_{TAR}$) 299 may be determined based on:

$$S_{TAR}=f^{-1}(T_{des},APC,I,E,AF,OT,\#). \quad (1)$$

This relationship may be embodied as an equation and/or as a lookup table. The air/fuel ratio (AF) may be the actual air/fuel ratio, as reported by the fuel control module 240. APC is an APC of the engine 102, I is an intake cam phaser angle, E is an exhaust cam phaser angle, OT is an oil temperature, and # is a number of activated cylinders.

When the spark timing is set to the optimum spark timing, the resulting torque may be as close to a minimum spark advance for best torque (MBT spark timing) as possible. Best torque refers to the maximum engine output torque that is generated for a given air flow as spark timing is advanced, while using fuel having an octane rating greater than a predetermined octane rating and using stoichiometric fueling. The spark timing at which this best torque occurs is referred to as an MBT spark timing. The optimum spark timing may differ slightly from MBT spark timing because of, for example, fuel quality (such as when lower octane fuel is used) and environmental factors. The engine output torque at the optimum spark timing may therefore be less than MBT.

The cylinder shut-off torque request 273 may be used by the cylinder control module 236 to determine a target number of cylinders to deactivate 276. The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once an fuel/air mixture that is already present in the cylinder has been combusted.

The fuel control module 240 may vary the amount of fuel provided to each cylinder based on the fuel torque request 274. More specifically, the fuel control module 240 may generate target fueling parameters 277 based on the fuel torque request 274. The target fueling parameters 277 may include, for example, target mass of fuel, target injection starting timing, and target number of fuel injections.

The air control module 228 generates the target MAP 266 based on a MAP estimated torque 278. The MAP estimated torque 278 corresponds to an estimated value of the present engine torque output determined based on a MAP 279 measured using the MAP sensor 184. The MAP torque estimation module 246 generates the MAP estimated torque 278 based on the MAP 279 and other measured engine operating parameters. For example, the MAP torque estimation module 246 generates the MAP estimated torque 278 using the relationship:

$$T_{MAP}=K_{RPM}+(S*K_S)+(S^2+K_S^2)+(MAP*S\cdot K_{MS})+ (MAP*S^2 \cdot K_{MS}^2)+(MAP*K_M), \quad (2)$$

where $T_{MAP}$ is the MAP estimated torque 278, MAP is the MAP 279, and S is present spark timing 280 being used by the spark actuator module 126. $K_{RPM}$, $K_S$, $K_{MS}$, and $K_M$ are predetermined values (coefficients) determined as discussed further below. The relationship may be embodied as an equation or as a look-up table. The air control module 228 may also determine the target throttle opening 267, the second target APC 268, and/or the third target APC 291 based on the MAP estimated torque 278.

The air control module 228 generates various target values further based on an APC estimated torque 283. For example, the air control module 228 may determine the target MAP 266, the target throttle opening 267, the second target APC 268, and/or the third target APC 291 based on the APC estimated torque 283. The APC estimated torque 283 corresponds to an estimated value of the present engine torque output determined based on a present APC 284. The present APC 284 is determined based on one or more measured parameters, such as the MAF, the MAP, and/or the IAT.

The APC torque estimation module 244 generates the APC estimated torque 283 based on the present APC 284 and other measured engine operating parameters. For example, the APC torque estimation module 244 may generate the APC estimated torque 283 using the relationship:

$$T_{APC}=K_{RPM}+(S\cdot K_S)+(S^2+K_S^2)+(APC*S\cdot K_{AS})+ (APC*S^2\cdot K_{AS}^2)+(APC*K_A)+(APC^2+K_A^2), \quad (3)$$

where $T_{APC}$ is the APC estimated torque 283, APC is the present APC 284, and S is the present spark timing 280 being used by the spark actuator module 126. $K_{RPM}$, $K_S$, $K_{AS}$, and $K_A$ are predetermined values (coefficients) determined as discussed further below. The relationship may be embodied as an equation or as a look-up table. In various implementations, the relationship may omit the term in the last parenthetical and be expressed as:

$$T_{APC}=K_{RPM}+(S\cdot K_S)+(S^2+K_S^2)+(APC*S\cdot K_{AS})+ (APC*S^2\cdot K_{AS}^2)+(APC*K_A). \quad (4)$$

The air control module 228 may output the target throttle opening 267 to the throttle actuator module 116. The throttle actuator module 116 regulates the throttle valve 112 to produce the target throttle opening 267. The air control module 228 outputs the target MAP 266 to the boost control module 248. The boost control module 248 controls the wastegate 162 based on the target MAP 266. The air control module 228 outputs the second target APC 268 to the phaser control module 252. Based on the second target APC 268 and the engine speed (and/or crankshaft position), the phaser control module 252 may control positions of the intake and/or exhaust cam phasers 148 and 150.

Figure 3:
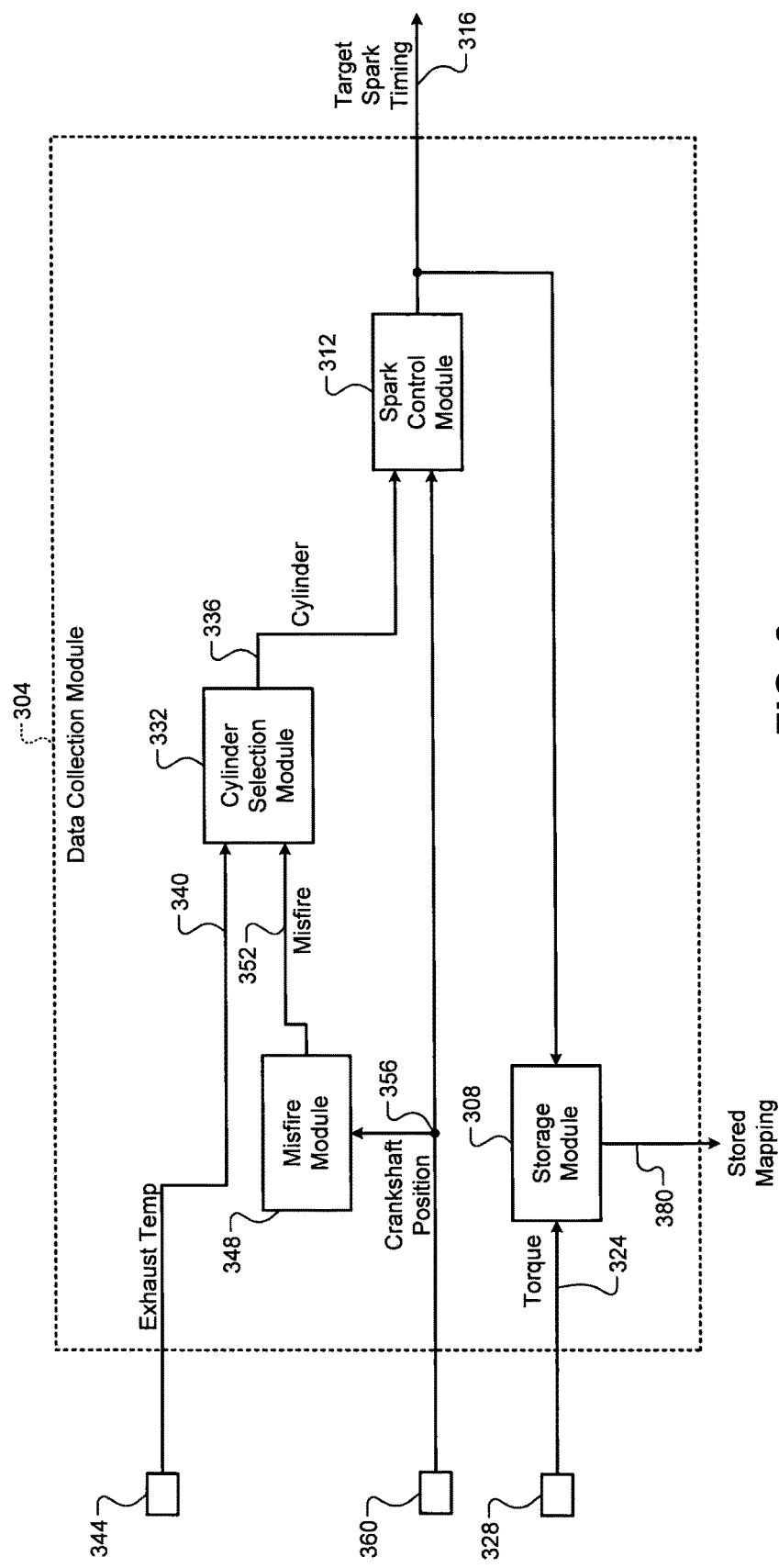
FIG. 3 is a functional block diagram of an example data collection module.

FIG. 3 is a functional block diagram of an example data collection module 304. For example, only, a dynamometer may include the data collection module 304. The data collection module 304 controls the engine 102 based on a plurality of predetermined combinations of engine speed and APC (or engine load). A predetermined fueling equivalence ratio (EQR), such as approximately a stoichiometric EQR, may be used for each of the combinations of engine speed and APC. A storage module 308 stores operating parameters measured using sensors during operation of the engine 102 at the combinations of engine speed and APC, such as engine torque output. While the example of engine torque output is provided, other operating parameters measured using sensors are also stored.

Figure 4A:
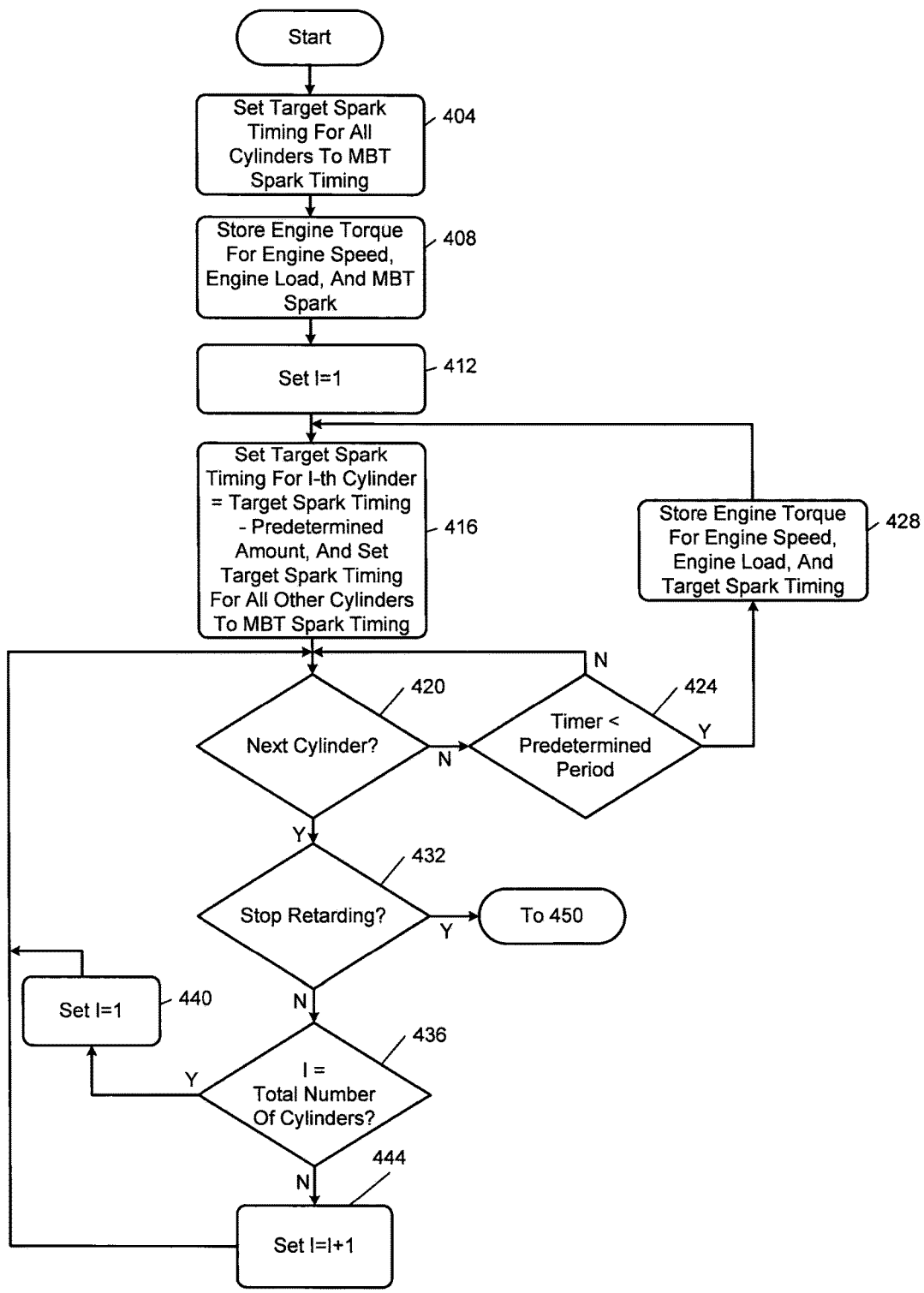
FIGS. 4A-4B include a flowchart depicting an example method of controlling spark timing for collecting engine torque output measurements.
Figure 4B:
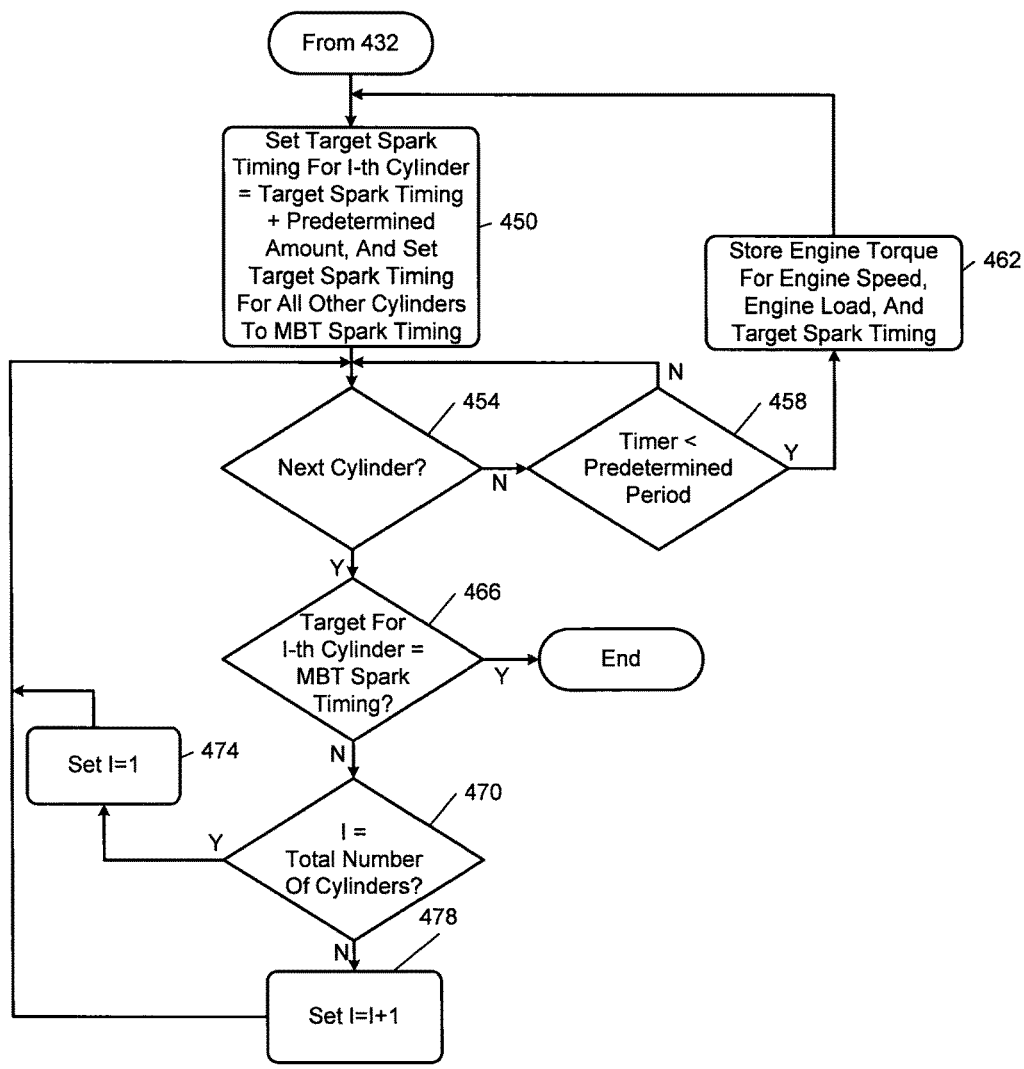

FIGS. 4A-4B include a flowchart depicting an example method of controlling spark timing for a predetermined combination of engine speed and APC. FIG. 5 is an example graph of spark timing 504 over time 508. Operation of the data collection module 304 will be discussed in conjunction with the examples of FIGS. 4A, 4B, and 5.

Control may begin with 404 (FIG. 4A) where a spark control module 312 sets a target spark timing 316 for a predetermined combination of engine speed and APC to the MBT spark timing for that engine speed and APC. Spark is then provided to all of the cylinders of the engine 102 at the MBT spark timing. As shown in FIG. 5, spark 512 is provided at the MBT spark timing 516 beginning at time zero. The spark control module 312 may supply the MBT spark timing to all of the cylinders for a predetermined period at 404.

Combustion occurs within the cylinders of the engine 102 in a predetermined firing order. While providing spark to all of the cylinders at the MBT spark timing for a given engine speed and APC, a storage module 308 stores a torque output 324 of the engine 102 in memory at 408. The storage module 308 indexes the engine torque output 324 by the MBT spark timing, the engine speed, and the APC. The engine torque output 324 is measured using a torque sensor 328.

A cylinder selection module 332 sets a cylinder selection variable I 336 to 1 (one) at 412. The cylinder selection variable I 336 corresponds to one of the cylinders in the predetermined firing order of the cylinders. For example only, I=1 corresponds to the first cylinder in the predetermined firing order, I=2 corresponds to the second cylinder in the predetermined firing order, and so on.

At 416, the spark control module 312 retards the target spark timing 316 for the I-th one of the cylinders in the predetermined firing order by a predetermined retard amount. For example, the spark control module 312 may set the target spark timing 316 for the I-th one of the cylinders in the predetermined firing order to (the previous value of) the target spark timing 316 minus the predetermined retard amount. A first time that 416 is performed, the spark control module 312 sets the target spark timing 316 for the I-th one of the cylinders to the MBT spark timing minus the predetermined retard amount. For example only, the predetermined retard amount may be approximately 0.25 crank angle degrees (CAD) or another suitable amount of spark retardation.

The spark control module 312 also maintains the target spark timing 316 for all of the other cylinders at the MBT spark timing at 416. The spark control module 312 may also reset and start a timer value at 416. The timer value therefore corresponds to the period since the target spark timing 316 for the I-th one of the cylinders was retarded.

At 420, the cylinder selection module 332 determines whether one or more conditions are satisfied for incrementing I 336. In other words, the cylinder selection module 332 determines whether one or more conditions are satisfied for changing which one of the cylinders is to be supplied with the retarded spark timing. If 420 is true, control continues with 432. If 420 is false, control continues with 424. For example, the cylinder selection module 332 may increment I 336 when an exhaust temperature 340 is greater than a predetermined temperature and/or engine misfire occurs.

The exhaust temperature 340 is measured using an exhaust temperature sensor 344 measuring a temperature of exhaust output by the engine 102. A misfire module 348 may generate a misfire signal 352 that indicates whether engine misfire has occurred. The misfire module 348 may determine whether engine misfire has occurred, for example, based on a crankshaft position 356 measured using a crankshaft position sensor 360 measuring rotation of the crankshaft of the engine 102. For example, the misfire module 348 may determine an engine speed, an acceleration, and a jerk based on the crankshaft position 356 and determine that engine misfire has occurred, for example, when the jerk is greater than a predetermined value. While crankshaft position based engine misfire detection is provided as an example, engine misfire may be diagnosed in other manners, such as based on cylinder pressure measured using a cylinder pressure sensor.

When I 336 is incremented, the spark control module 312 retards the target spark timing 316 for the (new) I-th cylinder to the (already retarded) target spark timing 316 that was supplied to the previous I-th cylinder. The spark control module 312 then sets the target spark timing 316 for all of the other cylinders, including the previous I-th cylinder, to the MBT spark timing. Examples of times when I 336 is incremented are illustrated by solid vertical lines in FIG. 5, some of which are indicated by 520.

At 424, the spark control module 312 may determine whether the timer value is greater than a predetermined period. If 424 is true, the storage module 308 stores the engine torque output 324 at 428, and control returns to 416 to again retard the target spark timing 316 for the I-th one of the cylinders in the predetermined firing order by the predetermined retard amount. If 424 is false, control returns to 420 and continues to use the same value of the target spark timing 316 for the I-th cylinder in the predetermined firing order.

In this manner, the spark control module 312 retards the target spark timing 316 by the predetermined retard amount each predetermined period. The cylinder that is receiving the (retarded) target spark timing 316 is changed, for example, when the exhaust temperature 340 is greater than the predetermined temperature and/or engine misfire occurs, and spark is supplied to all of the other cylinders at the MBT spark timing. The predetermined period may be, for example, approximately 250 milliseconds (ms), a predetermined number of crankshaft rotations, a predetermined number of engine cycles, or another suitable period.

Retarding spark timing increases the temperature of resulting exhaust. Retarding the spark timing of one cylinder at a time increases the temperature of the resulting exhaust to a lesser extent than retarding the spark timing of all of the cylinders. Retarding the spark timing of one cylinder at a time therefore allows a greater range of spark retard to be used and, therefore, more values of the engine torque output 324 to be measured and stored.

At 432, the spark control module 312 may determine whether one or more conditions are present for stopping spark timing retardation for the combination of engine speed and APC. For example, the spark control module 312 may determine whether a predetermined amount of engine misfire has occurred, whether the exhaust temperature 340 has been greater than the predetermined temperature for greater than a predetermined period, and/or whether the target spark timing 316 for the I-th cylinder is equal to a predetermined maximum retarded spark timing. In FIG. 5, this occurs at approximately time 524. If 432 is true, control may continue with 450 of FIG. 4B to begin advancing the target spark timing back toward the MBT spark timing. If 432 is false, control continues with 436.

At 436, when spark timing retardation is to continue, the cylinder selection module 332 determines whether I 336 is equal to the total number of cylinders of the engine 102. If 436 is true, the cylinder selection module 332 may set I 336 to 1 at 440, and the spark control module 312 supplies the (already retarded) target spark timing to the first cylinder in the predetermined firing order. If 436 is false, control increments I 336 at 444, and the spark control module 312 supplies the (already retarded) target spark timing to the next cylinder in the predetermined firing order. While discussion of the use of the predetermined firing order of the cylinders is discussed, selecting the cylinders in another suitable sequence may be used.

At 450 (FIG. 4B), when spark timing retardation is to stop for the combination of engine speed and APC, the spark control module 312 advances the target spark timing 316 for the I-th one of the cylinders in the predetermined firing order by a predetermined advance amount. For example, the spark control module 312 may set the target spark timing 316 for the I-th one of the cylinders in the predetermined firing order to the target spark timing 316 plus the predetermined advance amount. The predetermined advance amount may be the same or different than the predetermined retard amount. For example, the predetermined advance amount may be approximately 0.25 CAD or another suitable amount of spark advancement.

The spark control module 312 also maintains the target spark timing 316 for all of the other cylinders at the MBT spark timing at 450. The spark control module 312 may also reset and start a timer value at 450. The timer value therefore corresponds to the period since the target spark timing 316 for the I-th one of the cylinders was advanced.

At 454, the cylinder selection module 332 determines whether one or more conditions are satisfied for incrementing I 336. If 454 is true, control continues with 466. If 454 is false, control continues with 458. For example, the cylinder selection module 332 may increment I 336 when the exhaust temperature 340 is greater than the predetermined temperature and/or engine misfire occurs.

When I 336 is incremented, the spark control module 312 advances the target spark timing 316 for the (new) I-th cylinder to the target spark timing 316 that was supplied to the previous I-th cylinder. The spark control module 312 then sets the target spark timing 316 for all of the other cylinders, including the previous I-th cylinder, to the MBT spark timing.

At 458, the spark control module 312 may determine whether the timer value is greater than a predetermined period. If 458 is true, the storage module 308 stores the engine torque output 324 at 462, and control returns to 450 to again advance the target spark timing 316 for the I-th one of the cylinders in the predetermined firing order by the predetermined advance amount. If 458 is false, control returns to 454 and continues to use the same value of the target spark timing 316 for the I-th cylinder in the predetermined firing order.

At 466, the spark control module 312 may determine whether the target spark timing 316 for the I-th one of the cylinders is equal to the MBT spark timing. If 466 is true, control may end. If 466 is false, control continues with 470.

The cylinder selection module 332 determines whether I 336 is equal to the total number of cylinders of the engine 102 at 470. If 470 is true, the cylinder selection module 332 may set I 336 to 1 at 474, and the spark control module 312 supplies the same target spark timing to the first cylinder in the predetermined firing order. If 470 is false, control increments I 336 at 478, and the spark control module 312 supplies the same target spark timing to the next cylinder in the predetermined firing order.

While control is shown and discussed as ending after 466, FIGS. 4A and 4B are illustrative of one control loop, and a control loop may be performed for each of the predetermined combinations of engine speed and APC. In this manner, one or more values of the engine torque output 324 are stored for a plurality of different amounts of spark retard for each of the predetermined combinations of engine speed and APC.

Figure 6:
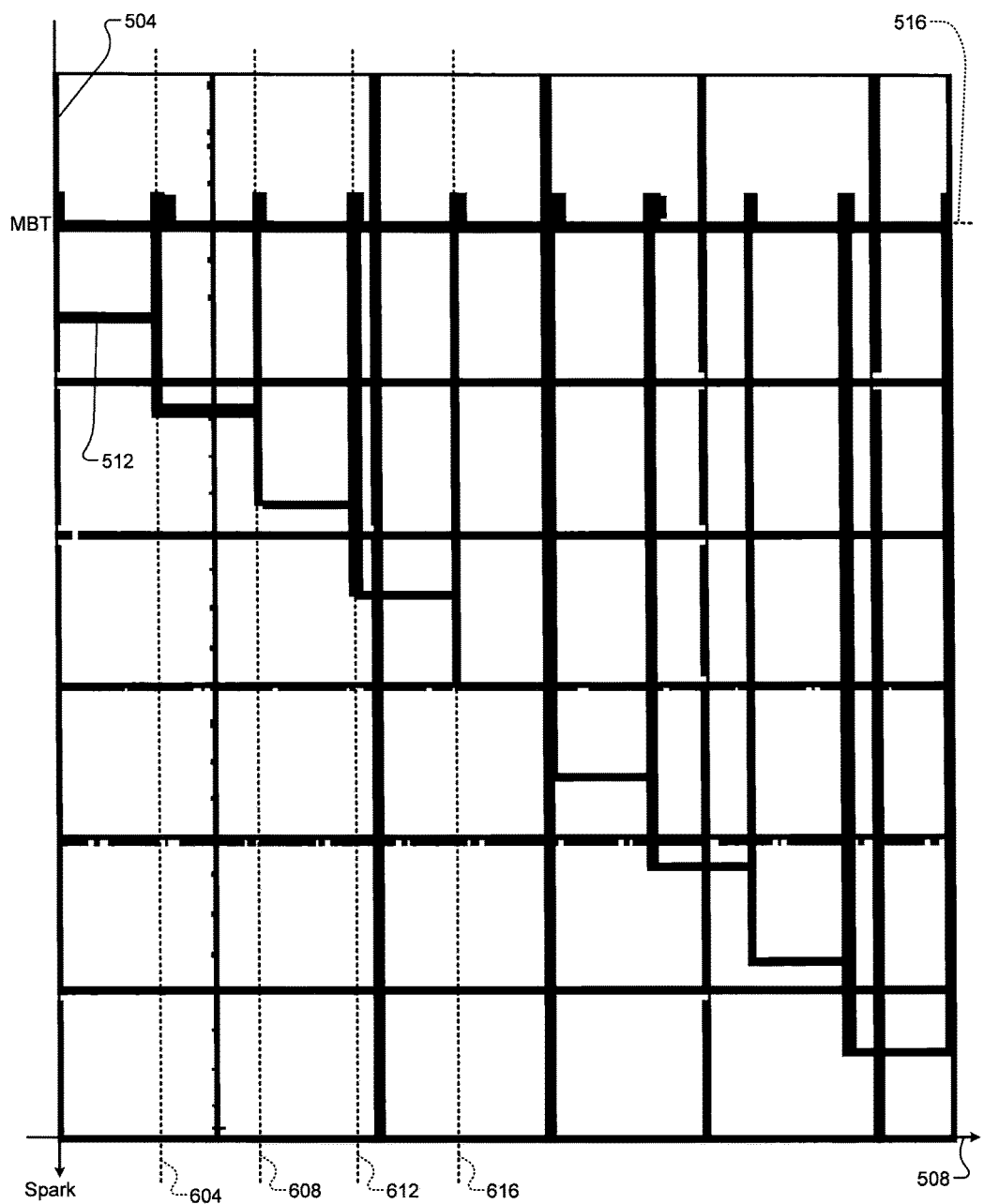
Figure 7:
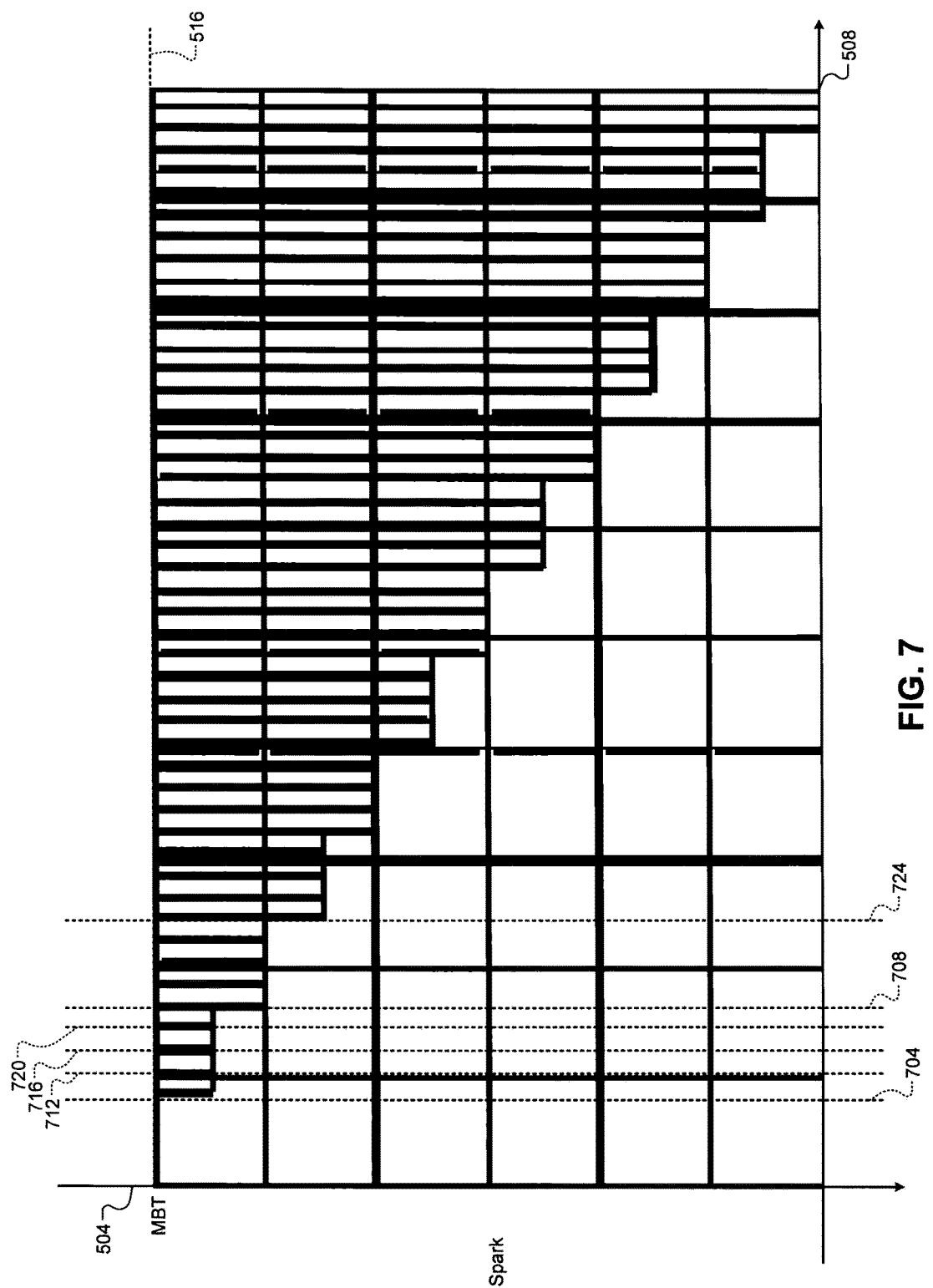

FIGS. 6 and 7 also include example graphs of spark timing 504 over time 508 for a combination of engine speed and APC. FIG. 6 illustrates that the spark control module 312 may retard the target spark timing for a first one of the cylinders from the MBT spark timing by a predetermined retard amount for a first predetermined period. For example, the target spark timing for the first one of the cylinders is retarded from the MBT spark timing by the predetermined retard amount during the first predetermined period defined by times 604 and 608. The spark control module 312 supplies spark to all of the other cylinders at the MBT spark timing for the engine speed and APC between times 604 and 608. The storage module 308 stores the engine torque output 324 between times 604 and 608 for the target spark timing, the engine speed, and the APC.

The spark control module 312 may retard the target spark timing for a second (different) one of the cylinders from the MBT spark timing by twice the predetermined retard amount for a second predetermined period following the first predetermined period. For example, the target spark timing for the second of the cylinders is retarded from the MBT spark timing by twice the predetermined retard amount during the second predetermined period defined by times 608 and 612. The spark control module 312 supplies spark to all of the other cylinders at the MBT spark timing for the engine speed and APC between times 608 and 612. The storage module 308 stores the engine torque output 324 between times 608 and 612 for the target spark timing, the engine speed, and the APC.

The spark control module 312 may retard the target spark timing for a third (different) one of the cylinders from the MBT spark timing by triple the predetermined retard amount for a third predetermined period following the second predetermined period. For example, the target spark timing for the second of the cylinders is retarded from the MBT spark timing by three times the predetermined retard amount during the third predetermined period defined by times 612 and 616. The spark control module 312 supplies spark to all of the other cylinders at the MBT spark timing for the engine speed and APC between times 612 and 616. The storage module 308 stores the engine torque output 324 between times 612 and 616 for the target spark timing, the engine speed, and the APC.

This may continue until the spark control module 312 determines to stop the spark timing retardation, such as when the predetermined amount of engine misfire has occurred, the exhaust temperature 340 has been greater than the predetermined temperature for greater than the predetermined period, and/or the target spark timing is equal to the predetermined maximum retarded spark timing. As discussed above, the spark timing retardation may be performed for each predetermined combination of engine speed and APC.

FIG. 7 illustrates that the spark control module 312 may retard the target spark timing from the MBT spark timing by a predetermined retard amount for a first predetermined period defined by times 704 and 708. The spark control module 312 supplies the target spark timing (retarded from the MBT spark timing by the predetermined retard amount) to a first one of the cylinders for a second predetermined period defined by times 704 and 712 during the first predetermined period. The spark control module 312 provides spark to all of the other cylinders at the MBT spark timing between times 704 and 712. The storage module 308 stores the engine torque output 324 measured during the second predetermined period for the target spark timing, the engine speed, and the APC.

The spark control module 312 supplies the target spark timing (retarded from the MBT spark timing by the predetermined retard amount) to a second one of the cylinders for a third predetermined period defined by times 712 and 716 during the first predetermined period. The spark control module 312 provides spark to all of the other cylinders at the MBT spark timing between times 712 and 716. For example, the second one of the cylinders may be the second cylinder in the predetermined firing order. The storage module 308 stores the engine torque output 324 measured during the third predetermined period for the target spark timing, the engine speed, and the APC.

The spark control module 312 supplies the target spark timing (retarded from the MBT spark timing by the predetermined retard amount) to a third one of the cylinders for a fourth predetermined period defined by times 716 and 720 during the first predetermined period. The spark control module 312 provides spark to all of the other cylinders at the MBT spark timing between times 716 and 720. For example, the third one of the cylinders may be the third cylinder in the predetermined firing order. The storage module 308 stores the engine torque output 324 measured during the fourth predetermined period for the target spark timing, the engine speed, and the APC.

The spark control module 312 supplies the target spark timing (retarded from the MBT spark timing by the predetermined retard amount) to a fourth one of the cylinders for a fifth predetermined period defined by times 720 and 708 during the first predetermined period. The spark control module 312 provides spark to all of the other cylinders at the MBT spark timing between times 720 and 708. For example, the fourth one of the cylinders may be the third cylinder in the predetermined firing order. The storage module 308 stores the engine torque output 324 measured during the fifth predetermined period for the target spark timing, the engine speed, and the APC. While the example of FIG. 7 is discussed in terms of a 4 cylinder engine, where the first predetermined period may be divided into another suitable number of predetermined periods for engines having a different number of cylinders.

The spark control module 312 retards the target spark timing from the MBT spark timing by two times the predetermined retard amount during a sixth predetermined period defined by times 708 and 724. During the sixth predetermined period, the spark control module 312 applies this target spark timing (from the MBT spark timing by twice the predetermined retard amount) to the cylinders individually during respective periods during the sixth predetermined period, as done during the first predetermined period. While supplying the retarded target spark timing to one of the cylinders during its respective predetermined period during the sixth predetermined period, the spark control module 312 supplies spark to all of the other cylinders at the MBT spark timing for the engine speed and APC. The storage module 308 stores the engine torque output 324 measured during each predetermined period with the retarded spark timing used, the engine speed, and the APC.

This may continue until the spark control module 312 determines to stop the spark timing retardation, such as when the predetermined amount of engine misfire has occurred, the exhaust temperature 340 has been greater than the predetermined temperature for greater than the predetermined period, and/or the target spark timing is equal to the predetermined maximum retarded spark timing. As discussed above, the spark timing retardation may be performed for each predetermined combination of engine speed and APC.

Referring back to FIG. 3, after each of the predetermined combinations of engine speed and APC have been addressed, the storage module 308 will have populated a stored mapping 380 of measured engine torque output indexed by spark timing (including MBT and each retarded spark timing used), engine speed, and APC. The stored mapping 380 may be used to set the predetermined values (coefficients) $K_{RPM}$, $K_S$, $K_{MS}$, $K_M$, $K_{AS}$, and $K_A$ that are used to determine the MAP estimated torque 278 and the APC estimated torque 283, as discussed above. While these predetermined values are provided as examples, the stored mapping 380 may be used to set other predetermined values or coefficients that are used to estimate torque based on MAP and to estimate torque based on APC, which may involve a greater or lesser number of predetermined values.

Figure 8:
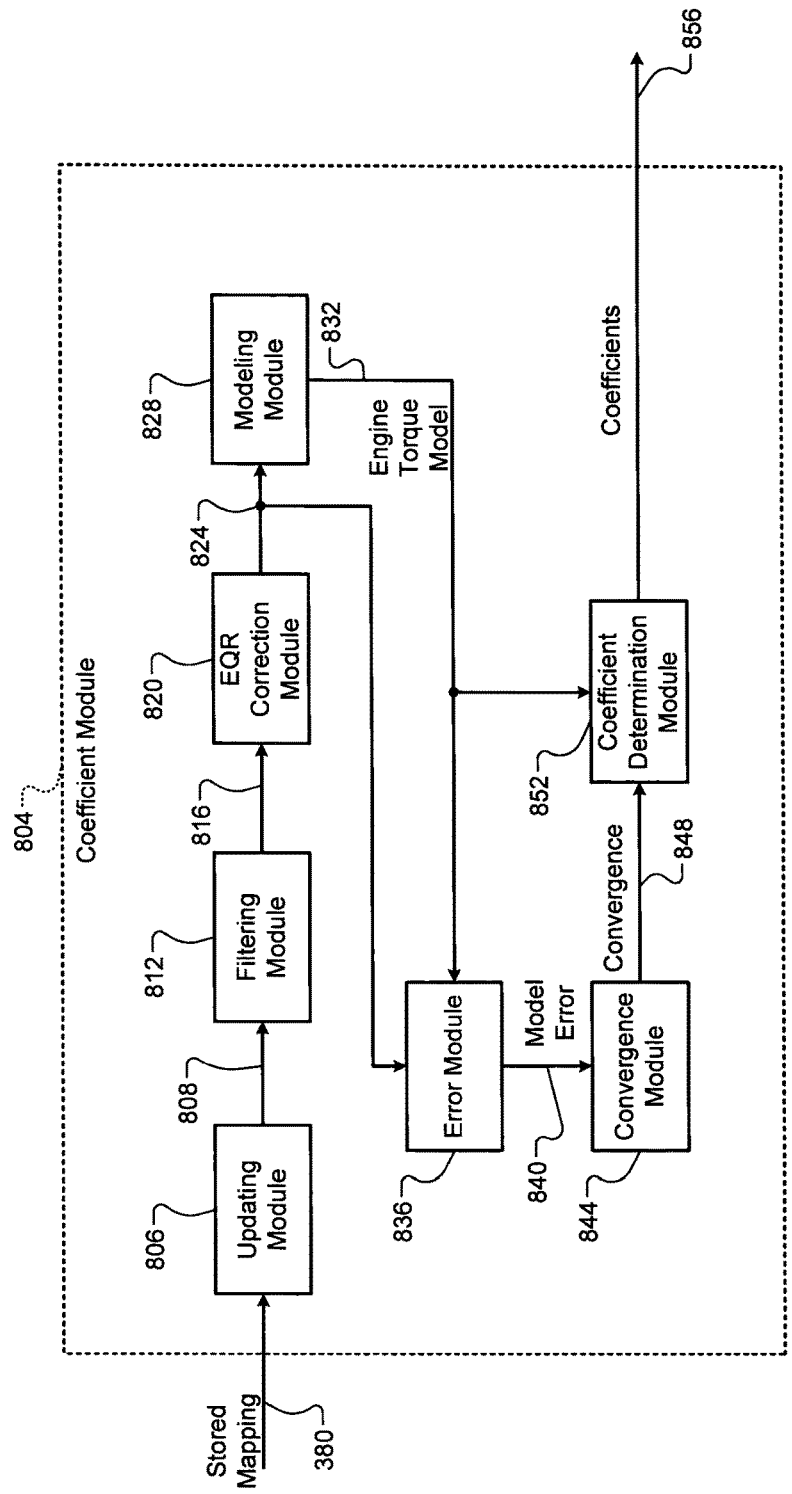
FIG. 8 is a functional block diagram of an example coefficient module.

FIG. 8 is a functional block diagram of an example coefficient module 804 that determines the predetermined values (coefficients) the $K_{RPM}$, $K_S$, $K_{MS}$, $K_M$, $K_{AS}$, and $K_A$. Because the engine torque outputs 324 are measured when the spark timing of one cylinder is retarded and all of the other cylinders are provided with the MBT spark timing, each of the engine torque outputs 324 reflects the torque loss of only one cylinder of the engine 102.

An updating module 806 determines a difference between (i) the engine torque output 324 measured when all cylinders were supplied with the MBT spark timing for a combination of engine speed and APC and (ii) the engine torque output 324 measured when the spark timing of one cylinder is retarded and all of the other cylinders are provided with the MBT spark timing. This difference corresponds to the torque loss of the one cylinder that had its spark timing retarded. The updating module 806 multiplies the difference by the total number of cylinders to determine a torque loss of all of the cylinders of the engine 102. This value corresponds to an average torque loss if the retarded spark timing was applied to all of the cylinders.

The updating module 806 determines an estimated engine torque output for the retarded spark timing based on a difference between (i) the engine torque output 324 measured when all cylinders were supplied with the MBT spark timing for a combination of engine speed and APC and (ii) the torque loss of all of the cylinders of the engine 102. The updating module 806 updates the entry of the stored mapping 380 for that retarded spark timing, engine speed, and APC with the estimated engine torque output determined. The updating module 806 performs this updating for each entry of the stored mapping 380 to produce an updated mapping 808. The updated mapping 808 includes the estimated engine torque outputs indexed by retarded spark timing, engine speed, and APC. The updated mapping 808 also includes the measured engine torque outputs 324 indexed by the MBT spark timing for each possible combination of engine speed and APC.

A filtering module 812 filters the entries of the updated mapping 808 to remove erroneous entries. For example, erroneous entries may include entries indicating engine torque output increases despite spark timing retardation for a combination of engine speed and APC. Engine torque output should not increase as spark timing is retarded at a constant engine speed and APC. The filtering module 812 may also remove other types of erroneous entries. The result of the filtering will be referred to as a filtered mapping 816.

An equivalence ratio (EQR) correction module 820 may correct entries of the filtered mapping 816 based on the equivalence ratio of the air/fuel mixture used while the data collection module 304 generated the stored mapping 380. The result of the correction will be referred to as a corrected mapping 824.

Based on the entries of the corrected mapping 824, a modeling module 828 generates a mathematical model 832 for relating values of engine speed, APC, and spark timing to estimated engine torque. For example, the modeling module 828 may generate the engine torque model 832 using a regression function or another suitable form of data modeling.

An error module 836 determines a model error 840 based on a difference between (i) an estimated engine torque value generated using the engine torque model 832 based on an engine speed, an APC, and a spark timing and (ii) the engine torque output stored in the corrected mapping 824 for the engine speed, the APC, and the spark timing. The error module 836 may determine a difference for multiple or all of the engine speed, APC, and spark timing combinations of the corrected mapping 824. The error module 836 may determine the model error 840 based on a sum of the differences.

A convergence module 844 determines whether the engine torque model 832 has converged with the corrected mapping 824 based on the model error 840. For example, the convergence module 844 may indicate that the engine torque model 832 has converged when the model error 840 is less than a predetermined value. The convergence module 844 may generate a convergence signal 848 that indicates whether the engine torque model 832 has converged. When the convergence module 844 determines that the engine torque model 832 has not converged, one or more other predetermined combinations of engine speed and APC may be added for testing by the data collection module 304, and the data collection module 304 may re-populate the stored mapping 380, as described above, for all of the predetermined combinations of engine speed and APC.

When the engine torque model 832 has converged, a coefficient determination module 852 determines the predetermined values (coefficients) $K_{RPM}$, $K_S$, $K_{MS}$, $K_M$, $K_{AS}$, and $K_A$ 856 based on the engine torque model 832. For example, the coefficient determination module 852 may determine the predetermined values 856 using a regression function. The predetermined values 856 can then be stored in the ECM 114 of the engine 102 and in the ECMs of other engines that are the same as the engine 102. These predetermined values can then be used to determine the MAP estimated torque 278 and the APC estimated torque 283, and to control various engine actuators, as described above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A data collection system for an engine comprising:
a spark control module that, for an engine speed and an engine load:
for a first predetermined period, supplies spark to each cylinder of the engine at a predetermined spark timing set for the engine speed and the engine load; and
for a second period following the first predetermined period:
provides spark to a first one of the cylinders at a first spark timing that is retarded relative to the predetermined spark timing; and
supplies spark to all of the other cylinders of the engine at the predetermined spark timing; and
a storage module that selectively stores in memory:
a first torque output of the engine measured during the first predetermined period; and
a second torque output of the engine measured during the second period.

2. The data collection system of claim 1 wherein the spark control module determines the first spark timing by retarding the predetermined spark timing by a predetermined amount.

3. The data collection system of claim 1 wherein, for a third period following the second period, the spark control module further:
provides spark to a second one of the cylinders of the engine at a second spark timing that is retarded relative to the first spark timing; and
supplies spark to all of the other cylinders of the engine at the predetermined spark timing,
wherein the first and second ones of the cylinders are different.

4. The data collection system of claim 3 wherein the spark control module:
determines the first spark timing by retarding the predetermined spark timing by a predetermined amount; and
determines the second spark timing by retarding the first spark timing by the predetermined amount.

5. The data collection system of claim 3 wherein, in response to a determination that an exhaust temperature is greater than a predetermined temperature, the spark control module provides spark to the second one of the cylinders at the second spark timing and supplies spark to all of the other cylinders at the predetermined spark timing.

6. The data collection system of claim 3 wherein, in response to engine misfire, the spark control module provides spark to the second one of the cylinders at the second spark timing and supplies spark to all of the other cylinders at the predetermined spark timing.

7. The data collection system of claim 1 wherein, for a third period following the second period, the spark control module further:
provides spark to a second one of the cylinders of the engine at the first spark timing that is retarded relative to the predetermined spark timing; and
supplies spark to all of the other cylinders of the engine, including the first one of the cylinders, at the predetermined spark timing,
wherein the first and second ones of the cylinders are different.

8. The data collection system of claim 7 wherein:
for a fourth period following the third period, the spark control module further:
provides spark to the second one of the cylinders of the engine at a second spark timing that is retarded relative to the first spark timing; and
supplies spark to all of the other cylinders of the engine at the predetermined spark timing.

9. The data collection system of claim 1 wherein the storage module:
stores the first torque output of the engine in a first entry of a mapping corresponding to the predetermined spark timing, the engine load, and the engine speed; and
stores the second torque output of the engine in a second entry of the mapping corresponding to the first spark timing, the engine load, and the engine speed.

10. A system comprising:
the data collection system of claim 1;
a coefficient module that:
based on the first and second torque outputs, generates an engine torque output model for estimating engine torque output; and
determines a plurality of coefficients based on the engine torque output model; and
an engine control module that:
determines an estimated torque output of an engine based on a spark timing, an engine speed, the plurality of coefficients, and one of an intake manifold pressure and an air per cylinder (APC); and
controls a throttle valve based on the estimated torque output of the engine.

11. A data collection method for an engine, the data collection method comprising:
for an engine speed and an engine load:
for a first predetermined period, supplying spark to each cylinder of an engine at a predetermined spark timing set for the engine speed and the engine load; and for a second period following the first predetermined period:
  providing spark to a first one of the cylinders at a first spark timing that is retarded relative to the predetermined spark timing; and
  supplying spark to all of the other cylinders of the engine at the predetermined spark timing; and
selectively storing in memory:
  a first torque output of the engine measured during the first predetermined period; and
  a second torque output of the engine measured during the second period.

12. The data collection method of claim 11 further comprising determining the first spark timing by retarding the predetermined spark timing by a predetermined amount.

13. The data collection method of claim 11 further comprising, for a third period following the second period:
  providing spark to a second one of the cylinders of the engine at a second spark timing that is retarded relative to the first spark timing; and
  supplying spark to all of the other cylinders of the engine at the predetermined spark timing,
  wherein the first and second ones of the cylinders are different.

14. The data collection method of claim 13 further comprising:
  determining the first spark timing by retarding the predetermined spark timing by a predetermined amount; and
  determining the second spark timing by retarding the first spark timing by the predetermined amount.

15. The data collection method of claim 13 further comprising, in response to a determination that an exhaust temperature is greater than a predetermined temperature:
  providing spark to the second one of the cylinders at the second spark timing; and
  supplying spark to all of the other cylinders at the predetermined spark timing.

16. The data collection method of claim 13 further comprising, in response to engine misfire:
  providing spark to the second one of the cylinders at the second spark timing; and
  supplying spark to all of the other cylinders at the predetermined spark timing.

17. The data collection method of claim 11 further comprising, for a third period following the second period:
  providing spark to a second one of the cylinders of the engine at the first spark timing that is retarded relative to the predetermined spark timing; and
  supplying spark to all of the other cylinders of the engine, including the first one of the cylinders, at the predetermined spark timing,
  wherein the first and second ones of the cylinders are different.

18. The data collection method of claim 17 further comprising, for a fourth period following the third period:
  providing spark to the second one of the cylinders of the engine at a second spark timing that is retarded relative to the first spark timing; and
  supplying spark to all of the other cylinders of the engine at the predetermined spark timing.

19. The data collection method of claim 11 further comprising:
  storing the first torque output of the engine in a first entry of a mapping corresponding to the predetermined spark timing, the engine load, and the engine speed; and
  storing the second torque output of the engine in a second entry of the mapping corresponding to the first spark timing, the engine load, and the engine speed.

20. A method comprising:
  based on the first and second torque outputs stored according to the method of claim 11:
    generating an engine torque output model for estimating engine torque output; and
    determining a plurality of coefficients based on the engine torque output model;
  determining an estimated torque output of an engine based on a spark timing, an engine speed, the plurality of coefficients, and one of an intake manifold pressure and an air per cylinder (APC); and
  controlling a throttle valve based on the estimated torque output of the engine.

* * * * *